US012090830B2

(12) United States Patent
Glöckner et al.

(10) Patent No.: US 12,090,830 B2
(45) Date of Patent: Sep. 17, 2024

(54) METHOD FOR OPERATING A DRIVE TRAIN OF A WORKING MACHINE, DRIVE TRAIN FOR A WORKING MACHINE, AND WORKING MACHINE

(71) Applicant: ZF Friedrichshafen AG, Friedrichshafen (DE)

(72) Inventors: Rico Glöckner, Pocking (DE); Migen Bebeti, Munich (DE); Jürgen Legner, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 460 days.

(21) Appl. No.: 17/441,104

(22) PCT Filed: Mar. 17, 2020

(86) PCT No.: PCT/EP2020/057277
§ 371 (c)(1),
(2) Date: Sep. 20, 2021

(87) PCT Pub. No.: WO2020/187905
PCT Pub. Date: Sep. 24, 2020

(65) Prior Publication Data
US 2022/0144057 A1    May 12, 2022

(30) Foreign Application Priority Data
Mar. 19, 2019   (DE) .......................... 102019203726.7

(51) Int. Cl.
*B60K 1/02*       (2006.01)
*B60W 10/02*      (2006.01)
(Continued)

(52) U.S. Cl.
CPC .............. *B60K 1/02* (2013.01); *B60W 10/02* (2013.01); *B60W 10/08* (2013.01);
(Continued)

(58) Field of Classification Search
CPC ......... B60K 1/02; B60W 10/02; B60W 10/08; B60W 10/113; B60W 30/1888; B60L 2200/36; B60L 2200/40; B60Y 2200/90
See application file for complete search history.

(56) References Cited

U.S. PATENT DOCUMENTS 6,852,054 B2 * 2/2005 Tumback ............... B60K 6/365
903/910
7,128,680 B2 * 10/2006 Holmes .................. B60K 6/445
475/201
(Continued)

FOREIGN PATENT DOCUMENTS

DE    102010031156 A1    1/2012
DE    202014000738 U1    4/2014
(Continued)

OTHER PUBLICATIONS

International Search Report and Written Opinion for PCT/EP2020/057277 mailed Jul. 14, 2020 (12 pages; with English translation).

*Primary Examiner* — Jacob B Meyer
(74) *Attorney, Agent, or Firm* — Kristin L. Murphy

(57) ABSTRACT

The disclosure relates to a method for operating a drive train of a working machine, wherein the drive train comprises a working drive and a travel drive. The working drive is driven by a first electric motor and the travel drive is driven by a second electric motor. The disclosed method includes that the travel drive is additionally driven by the first electric motor if at least one performance criterion of said travel drive has been met. The disclosure further relates to a corresponding drive train and to a working machine.

18 Claims, 5 Drawing Sheets

(51) Int. Cl.
   *B60W 10/08* (2006.01)
   *B60W 10/113* (2012.01)
   *B60W 30/188* (2012.01)

(52) U.S. Cl.
   CPC ...... *B60W 10/113* (2013.01); *B60W 30/1888* (2013.01); *B60L 2200/36* (2013.01); *B60L 2200/40* (2013.01); *B60Y 2200/90* (2013.01)

(56) References Cited

U.S. PATENT DOCUMENTS

| | | | | |
|---|---|---|---|---|
| 8,738,266 | B2* | 5/2014 | Kruse | B60K 6/52 |
| | | | | 701/84 |
| 8,955,345 | B2* | 2/2015 | Meitinger | B60L 58/26 |
| | | | | 62/61 |
| 9,387,752 | B2* | 7/2016 | Puiu | B60K 6/387 |
| 9,580,065 | B2* | 2/2017 | Bangura | B60K 1/02 |
| 9,656,659 | B2* | 5/2017 | Shukla | F16H 3/728 |
| 9,878,638 | B2* | 1/2018 | Wein | B60W 10/08 |
| 10,435,026 | B2* | 10/2019 | Shively | B60K 25/06 |
| 10,935,111 | B2* | 3/2021 | Lindenmaier | H02P 6/04 |
| 10,974,724 | B1* | 4/2021 | Shively | B60K 6/365 |
| 11,137,053 | B2* | 10/2021 | Steinberger | B60K 6/387 |
| 2003/0027682 | A1* | 2/2003 | Schmidt | B60W 20/40 |
| | | | | 903/910 |
| 2005/0067202 | A1* | 3/2005 | Shimizu | B60K 17/34 |
| | | | | 903/917 |
| 2010/0219007 | A1* | 9/2010 | Dalum | B60W 10/18 |
| | | | | 180/65.285 |
| 2011/0275470 | A1* | 11/2011 | Ekonen | B60K 17/35 |
| | | | | 74/665 F |
| 2013/0131920 | A1* | 5/2013 | Meitinger | B60G 17/0163 |
| | | | | 701/36 |
| 2013/0345019 | A1* | 12/2013 | Kaltenbach | B60K 6/547 |
| | | | | 903/902 |
| 2014/0171259 | A1* | 6/2014 | Genise | F16H 3/08 |
| | | | | 903/902 |
| 2016/0075257 | A1* | 3/2016 | Wein | B60L 50/51 |
| | | | | 180/65.7 |
| 2016/0091078 | A1* | 3/2016 | Fukunaga | F16H 57/021 |
| | | | | 74/606 R |
| 2017/0050063 | A1* | 2/2017 | Shively | A62C 33/04 |
| 2017/0108085 | A1* | 4/2017 | Morrow | B60K 6/365 |
| 2018/0222484 | A1* | 8/2018 | Shively | B60K 5/08 |
| 2022/0144057 | A1* | 5/2022 | Glöckner | B60W 30/1886 |
| 2022/0153255 | A1* | 5/2022 | Legner | B60L 50/60 |
| 2022/0186467 | A1* | 6/2022 | Bebeti | B60K 25/06 |

FOREIGN PATENT DOCUMENTS

| | | |
|---|---|---|
| EP | 0962597 A2 | 12/1999 |
| EP | 3098106 A1 | 11/2016 |
| WO | 2020182933 A1 | 9/2020 |

* cited by examiner

METHOD FOR OPERATING A DRIVE TRAIN OF A WORKING MACHINE, DRIVE TRAIN FOR A WORKING MACHINE, AND WORKING MACHINE

CROSS-REFERENCE TO RELATED APPLICATION

This application is a national stage of International Application No. PCT/EP2020/057277, filed Mar. 17, 2020, the disclosure of which is incorporated herein by reference in its entirety, and which claimed priority to German Patent Application No. 102019203726.7, filed Mar. 19, 2019, the disclosure of which is incorporated herein by reference in its entirety.

TECHNICAL FIELD

The present disclosure relates to a method for operating a drive train of a working machine, to a drive train for a working machine, and to a corresponding working machine.

BACKGROUND

Electrically driven working machines, such as, for example, wheel loaders, compact loaders, telescopic handlers, dumpers or excavators, are already known in the prior art. Such electrically driven working machines are either driven purely electrically, that is to say they have only an electric battery or an electric accumulator for their energy supply or they are driven diesel-electrically, which means that the required energy is provided by a diesel-driven generator, usually in conjunction with an electric buffer store, such as, for example, a correspondingly dimensioned capacitor. In all cases, however, the mechanical power required for the traction drive and the working drive is generated by one or more electric motors. Furthermore, hybrid-electric working machines are also known, in which the required mechanical power is generated primarily by a combustion engine, usually a diesel engine. An electric motor which is additionally provided here typically performs a so-called boost function.

In this context DE 20 2014 000 738 U1 describes a wheel loader which is driven purely electromotively, which has a first electric motor for a traction drive and a second electric motor for a working drive.

From EP 0 962 597 A2 there is known a battery-operated working machine which has two electric motors for the traction drive and a further electric motor for the working drive. The two electric motors for the traction drive are integrated into the front axle, wherein each electric motor drives a wheel.

The known electrically driven working machines are, however, disadvantageous in that the electric motor(s) provided for the traction drive, like the electric motor provided for the working drive, are each designed to be able to supply the maximum traction power or the maximum working power in every situation. This rigid design results in the use of correspondingly powerful and thus heavy and expensive electric motors.

What is needed is an improved method for operating a drive train of a working machine.

SUMMARY

A method for operating a drive train of a working machine is described herein.

The disclosure relates to a method for operating a drive train of a working machine, wherein the drive train comprises a working drive and a traction drive. The working drive is driven by a first electric motor and the traction drive is driven by a second electric motor. The method according to the disclosure is distinguished by the fact that the traction drive is additionally driven by the first electric motor if at least one power criterion of the traction drive is met.

The disclosure thus describes a method which relates to the operation of a drive train of a working machine, wherein the drive train includes two drives which can be operated independently of one another, namely the working drive and the traction drive. Each of these two drives, the working drive and the traction drive, has its own associated electric motor. The use of two independent electric motors to replace a single combustion engine is conventional in the prior art, since combustion engines can generally be configured to be more powerful than electric motors. In order to achieve greater flexibility in respect of the power dimensioning of the first and second electric motors, the disclosure proposes breaking the rigid association of the first electric motor solely with the working drive. Correspondingly, it becomes possible according to the disclosure to drive the traction drive additionally by the first electric motor in dependence on at least one power criterion of the traction drive.

The disclosure thus has the advantage that the second electric motor associated with the traction drive can be configured so as to be comparatively less powerful and thus lighter, smaller and less expensive than is conventional in the prior art, because, when the at least one power criterion is met, power provided by the first electric motor can additionally be used to operate the traction drive. A drive train operated in accordance with the disclosure thus has cost and weight advantages over known drive trains of the generic type.

In one exemplary arrangement, the at least one power criterion is the exceeding of a specific power threshold, wherein the power threshold can in turn be affected by boundary conditions.

For example, a power criterion can be met if the traction drive, that is to say the second electric motor, is operated at 80% or more of its maximum power. In this working range, the efficiency of an electric motor typically falls and the wear of the electric motor increases as a result of the high load, so that it can be more efficient and more expedient additionally to drive the traction drive by means of the first electric motor in order that both electric motors, that is to say the first and the second electric motor, can be operated in a comparatively more efficient working range.

Very generally, the at least one power criterion can be met whenever the second electric motor is unable to provide a required power by itself or whenever the second electric motor can be operated in a more efficient working range by addition of the first electric motor.

Possible boundary conditions which can influence the power threshold in one direction or another are, for example, a motor temperature, a charge state of an electrical energy store, or a power requirement of the working drive from the first electric motor. Likewise, inclines of the ground can be provided as boundary conditions, for example a power criterion can be met sooner when travelling uphill, because of the higher power requirement of the traction drive, than when travelling downhill.

It is also conceivable to provide not only a single first or second electric motor but a plurality of first or second electric motors which can be coupled with one another, for example, via a summation gear or can be separably connected in terms of drive to the first or second transmission arrangement via individual drive connections.

In one exemplary arrangement, the working drive further comprises a working transmission and the traction drive further comprises a traction transmission. The first electric motor thereby drives the working drive via the working transmission and the second electric motor drives the traction drive via the traction transmission.

In one exemplary arrangement, the working drive further comprises a hydraulic pump, which is driven by the first electric motor directly or via the working transmission. The hydraulic pump in turn generates a hydraulic pressure and a hydraulic current, which are used to operate the working drive. The working drive is thus an electro-hydraulic working drive which is driven by the first electric motor.

According to one exemplary arrangement of the disclosure it is provided that the at least one power criterion is exceeding of a limit speed. The limit speed is a specifiable speed which can be specified, for example, according to the nature of the working machine, according to the ground on which the working machine is travelling, or also depending on whether the working machine is in a coasting or traction mode. In particular, the limit speed can also be continuously newly determined by a correspondingly configured control unit. The use of the limit speed as the power criterion has the advantage that it is possible to determine comparatively easily, by determining the speed of the working machine, whether the second electric motor is being operated in an unfavorable power range. The reaching and maintenance of a specific speed by the traction drive of the working machine is necessarily associated with the generation of a specific power by the second electric motor, so that the travelling speed is particularly suitable for defining the power criterion. As soon as the limit speed is exceeded, a correspondingly high power load of the second electric motor is recognized and the traction drive is additionally driven by the first electric motor.

In one exemplary arrangement, the at least one power criterion is the exceeding of a limit acceleration. The reaching of a specific speed first requires a corresponding acceleration, wherein the acceleration, more than the maintenance of a speed, is usually associated with the generation of a comparatively high power by the second electric motor. Accordingly, the at least one power criterion can advantageously also be met when a specific acceleration is reached.

According to a further exemplary arrangement of the disclosure it is provided that the at least one power criterion is exceeding of a limit time for which the second electric motor is operated in a peak power range. A limit time is understood as being a specifiable period of time, for example 5 s. A peak power range is understood as being, for example, operation in a range between 75% and 100% of the maximum power of the second electric motor, in particular operation in the range between 90% and 100% of the maximum power of the second electric motor. This has the advantage that, depending on the specifiable period of time, long-term operation of the second electric motor in an inefficient and highly loaded working range is avoided by providing additional power for the traction drive by the first electric motor. At the same time, however, comparatively irregular operation of the traction drive can be avoided by first waiting for the limit time to elapse before the first electric motor is additionally used for operating the traction drive. Constant connection and disconnection of the first electric motor for the traction drive is thus avoided. For example, an acceleration of the traction drive which demands more than 75% of the maximum power of the second electric motor for only a short time does not immediately lead to the connection of the first electric motor for driving the traction drive.

According to a further exemplary arrangement of the disclosure it is provided that the at least one power criterion is exceeding of a limit gear stage of a traction transmission. A limit gear stage is understood as being a specifiable gear stage from a plurality of gear stages of the traction transmission. Each gear stage provides an individual speed spectrum on the basis of which conclusions can already be drawn about the power that is presumably to be provided by the traction drive. If a correspondingly high gear stage is exceeded, according to the example the limit gear stage, it can be assumed that the working machine will travel at a minimum speed that is dependent on this limit gear stage. Depending on the expected power requirement associated with the minimum speed of this limit gear stage, the at least one power criterion is deemed to be met.

In one exemplary arrangement, an actuation of a clutch of the traction transmission at the same time initiates the closing of a connecting clutch, wherein the connecting clutch couples the first electric motor with the traction drive in terms of drive, so that the traction drive can additionally be driven by the first electric motor.

According to one exemplary arrangement of the disclosure it is provided that the limit speed is a maximum of 20 km/h. This has been found to be very suitable.

In one exemplary arrangement, it is provided that the limit speed is a maximum of 16 km/h, in particular 12 km/h.

According to a further exemplary arrangement of the disclosure it is provided that the working drive is permanently driven by the first electric motor. The expression "permanently driven" is understood as meaning permanent coupling of the working drive with the first electric motor which cannot be separated by an interconnected clutch. It will be appreciated that, when the working machine is stopped, or when the first electric motor is stopped, the working drive is not driven. This permanent drive, or this permanent coupling, is advantageous in particular with regard to steering assistance, which is permanently required, for the working machine.

A power that is required by the working drive and supplied to the working drive is preferably provided via an adjustable operating point of the first electric motor which is adapted to the power requirement in each case.

According to a further exemplary arrangement of the disclosure it is provided that a power supply of the first electric motor to the working drive is adjusted or regulated via an adjustable piston stroke height of a hydraulic pump when the traction drive is additionally driven by the first electric motor. This has the advantage that the power of the first electric motor provided to the working drive can still be adapted to the power requirement actually required by the working drive when the first electric motor is additionally driving the traction drive. The speed of the first electric motor can thus advantageously be adjusted according to the requirement of the traction drive, since the power made available to the working drive can be adjusted, independently of the power provided by the first electric motor, via the adjustable piston stroke height of the hydraulic pump of the working drive. A large piston stroke height thereby leads to the generation of a high generated hydraulic power, while a small piston stroke height correspondingly leads to a low generated hydraulic power.

According to a further exemplary arrangement of the disclosure it is provided that the traction drive is additionally driven by the first electric motor only if the working drive can be provided with a power that it requires by the first electric motor. This has the advantage that it is ensured in every case that the working drive at all times receives the required power demanded by an operator of the working machine, so that it is possible to avoid a sudden power drop of the working drive, in particular a power drop that is not expected by the operator. A power drop of the working drive that is not expected by the operator could otherwise result in a dangerous situation, for example if a lifting apparatus of the working machine that is operated by the working drive no longer receives the power necessary to hold a lifted load. A short-time power drop in the traction drive, on the other hand, does not usually result in a dangerous situation.

It is important that the power requirement of the working drive is met fully by the first electric motor in particular in situations where comparatively high power requirements are made both by the traction drive and by the working drive which can no longer be provided in total by the first electric motor. Thus, if the required power exceeds the maximum power that can be provided by the first electric motor, the requirement of the working drive is first met in full. A remaining residual power of the first electric motor which can still be provided is then made available to the traction drive.

According to a further exemplary arrangement of the disclosure it is provided that the working drive is additionally also driven by the second electric motor if at least one power criterion of the working drive is met. Accordingly, in a reversal of the method steps outlined hereinbefore, power is thus transmitted from the second electric motor to the working drive. The drive connection that is already present for implementing the method according to the disclosure can be used for this purpose, but in the reverse power flow direction. The at least one power criterion preferably corresponds to a power threshold as has been described in connection with the at least one power criterion of the traction drive. The advantages already mentioned in connection with the additional driving of the traction drive by the first electric motor are obtained, vice versa, also for the working drive.

The disclosure relates further to a drive train for a working machine, wherein the drive train comprises a working drive having a working transmission and having a first electric motor, and a traction drive having a traction transmission and having a second electric motor, wherein the working drive can be driven by the first electric motor via the working transmission and wherein the traction drive can be driven by the second electric motor via the traction transmission. The drive train according to the disclosure is distinguished by the fact that a drive connection can be established between the working drive and the traction drive via a connecting clutch. The drive train according to the disclosure thus allows the method according to the disclosure to be implemented, which results in the advantages already described in connection with the method according to the disclosure.

The drive connection can in principle take place via any desired point of the working drive driven by the first electric motor to any desired point of the traction drive. For example, the drive connection can take place from a motor shaft of the first electric motor via the connecting clutch directly to an output shaft of the traction drive. Likewise, the drive connection can, however, also take place from an output shaft of the working drive via the connecting clutch to a specific gear stage of the traction drive.

In one exemplary arrangement, at least the traction transmission has a plurality of gear stages in the form of forward gears and at least one gear stage in the form of a reverse gear. In one specific exemplary arrangement, the number of forward gears corresponds to the number of reverse gears. The working transmission can also have more than only one gear stage in the form of a forward gear. In addition, one or more gear stages of the working transmission that are in the form of a reverse gear are also conceivable.

The traction transmission and/or the working transmission can optionally be of the planetary type or of the countershaft type.

According to one exemplary arrangement of the disclosure it is provided that the drive connection runs from the first electric motor to the traction drive via an intermediate shaft for adaptation of the direction of rotation. Adaptation of the direction of rotation is a necessary requirement in order to be able to drive the traction drive additionally via the first electric motor. By using an intermediate shaft for adapting the direction of rotation, the direction of rotation of the first electric motor itself does not have to be changed, which has the advantage that a hydraulic pump of the working drive can continue to be driven by the first electric motor. The hydraulic pump is usually operable in only one direction. Operation of the hydraulic pump in the other direction of rotation, on the other hand, usually leads to the hydraulic pump being damaged or even destroyed.

According to one exemplary arrangement of the disclosure it is provided that the intermediate shaft is an intermediate shaft of the traction transmission. This has the advantage that an additional intermediate shaft does not have to be provided because an intermediate shaft that is in any case already present is used. In terms of its transmission elements, a drive train according to the disclosure is thus substantially no more complex or cost-intensive in its design than a comparable drive train of the generic type.

According to a further exemplary arrangement of the it is provided that a separate transmission stage is provided via which the speed and/or direction of rotation of the first electric motor can be adapted to that of the second electric motor. The transmission stage thus makes possible not only an adaptation of the direction of rotation but additionally an adaptation of the speed. The adaptation of the speed is important inasmuch as the first and the second electric motors together drive the traction drive and accordingly must have an identical speed at the latest at the output of the traction drive. Otherwise, the first electric motor would be driven by the second electric motor, or vice versa. For example, it is conceivable that the first electric motor has comparatively lower speeds at its motor shaft but comparatively higher torques than the second electric motor. In order that the first and the second electric motor can, for example, advantageously be operated together at an identical or at least approximately identical working point, for example in each case 50% of the maximum power, an adaptation of the speed is therefore necessary. In addition, the transmission stage can also carry out an adaptation of the speed while taking account of the power requirement of the working drive. This means that an adaptation of the speed of the first electric motor can take place at an operating point of, for example, 65% of the maximum power to an operating point of the second electric motor of, for example, only 50% of the maximum power. It is thereby ensured that the first electric motor can continue to supply the working drive with a power required thereby.

In one exemplary arrangement, the transmission stage is shiftable over a plurality of gear stages, in order to achieve, while taking account of the power requirement of the working drive, in each case an adaptation of the speed that is as ideally suitable as possible.

Moreover, in one exemplary arrangement, the drive train is configured, for the case where the first electric motor additionally drives the traction drive, to adjust or regulate a power supply of the first electric motor to the working drive via an adjustable piston stroke height of a hydraulic pump of the working drive.

According to one exemplary arrangement of the disclosure it is provided that the traction transmission is configured to be power-shiftable over a plurality of gear stages. This results in increased flexibility of the drive train according to the disclosure.

In one exemplary arrangement, the traction transmission is configured to be power-shiftable over all gear stages.

In one exemplary arrangement, the working transmission is also configured to be shiftable, in particular power-shiftable.

According to a further exemplary arrangement of the disclosure it is provided that the drive train is configured to implement the method according to the disclosure.

In order to ensure that the method according to the disclosure is implemented optimally by the drive train according to the disclosure, the first electric motor and the second electric motor are matched to one another in terms of the power they are able to provide and their torque-speed characteristic. This means that the maximum power which can be provided by the first electric motor advantageously moves in a range of from 50% to 150% of the maximum power which can be provided by the second electric motor, in particular in a range of from 80% to 120%. In addition, the torque-speed characteristic of the first electric motor advantageously moves in a range of from 50% to 150% of the torque-speed characteristic of the second electric motor, in particular in a range of from 80% to 120%.

In one exemplary arrangement, the drive train further comprises, for controlling or regulating the speed or torque of or the power to be provided by the first electric motor and the second electric motor, in each case an own power electronics or a single common power electronics. Likewise, the drive train comprises an electronic control device which controls or regulates the first electric motor and the second electric motor via the respective own power electronics or via the common power electronics.

According to one exemplary arrangement of the disclosure it is provided that the first electric motor and the second electric motor are arranged in a common housing. This allows the first electric motor and the second electric motor to be arranged in a space- and weight-saving manner within the drive train in a working machine. Moreover, the common housing saves weight and costs compared to two individual housings. The first and the second electric motor can be installed in a common housing, for example, axially one behind the other, wherein the motor output shafts, for example, can point out of the housing in opposite axial directions. However, an arrangement axially side by side in a correspondingly configured housing is likewise possible, so that the two output shafts can point, for example, in the same axial direction.

In one exemplary arrangement, the first electric motor and/or the second electric motor are further configured to recover kinetic energy in braking operation of the working machine. The drive connection according to the disclosure can be established between the first electric motor and the second transmission arrangement via the first clutch such that kinetic energy can advantageously be recovered both by the second electric motor and by the first electric motor. For this purpose, the drive train may further advantageously comprise an electrical energy store to which the electrical energy supplied by the recovery operation can be supplied. In recovery operation, the first electric motor and/or the second electric motor work as generators and convert mechanical, namely kinetic, energy into electrical energy. This electrical energy can later be drawn from the electrical energy store again if required, in order to supply the first electric motor and/or the second electric motor. In addition, it can also be provided that the electrical energy store can be charged with external electrical energy via a charging cable or other suitable charging device, for example an inductive charging device. The use of the first electric motor and/or the second electric motor for recovery additionally reduces the wear of a mechanical friction brake.

The disclosure relates further to a working machine comprising a drive train according to the disclosure. The advantages already described in connection with the drive train according to the disclosure are also obtained for the working machine according to the disclosure.

In one exemplary arrangement, the working machine is in the form of a wheel loader.

Alternatively, the working machine can also be in the form of a dumper, excavator, telescopic handler or tractor.

BRIEF DESCRIPTION OF THE DRAWINGS

The disclosure will be explained by way of example hereinbelow with reference to embodiments shown in the figures, by which.

DETAILED DESCRIPTION

Figure 1:
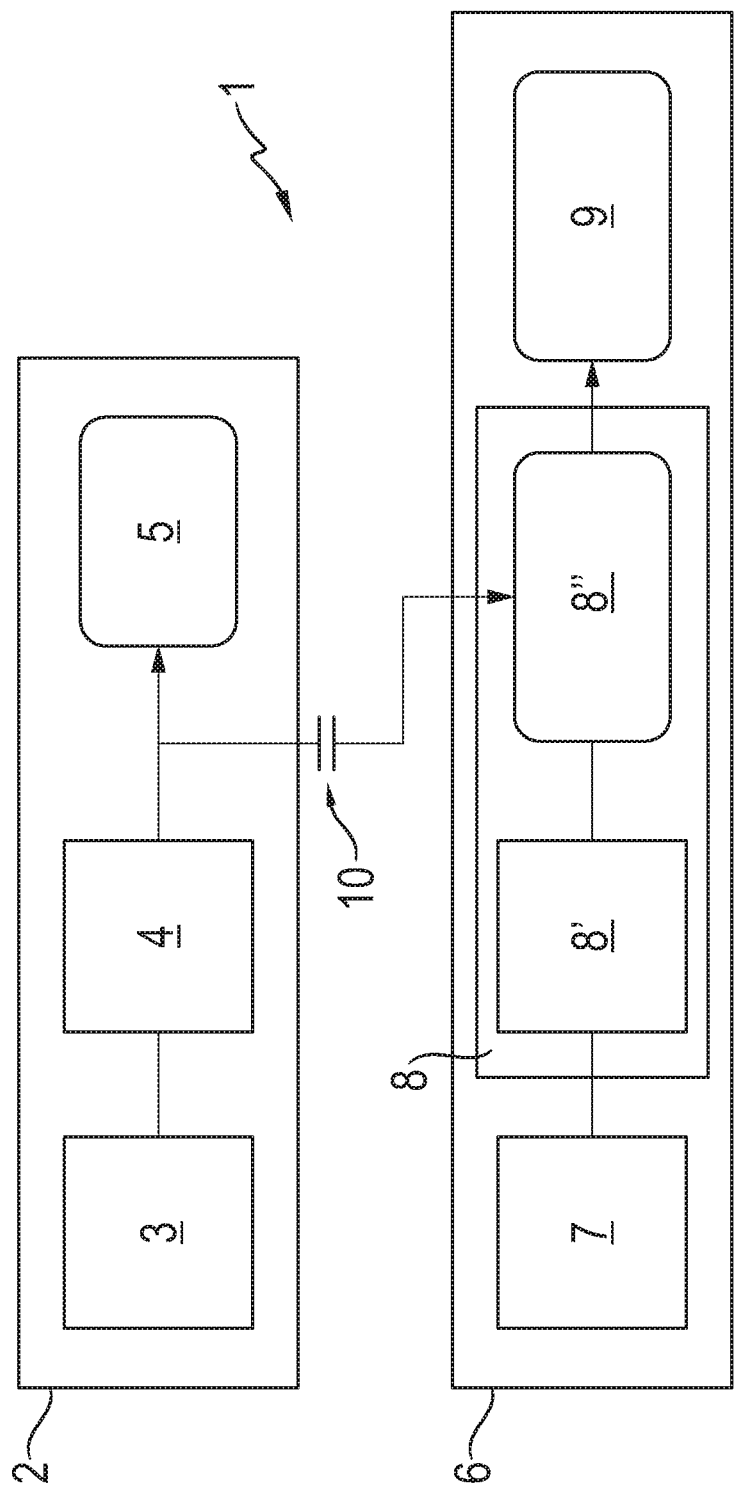
FIG. 1 shows, by way of example and schematically, a possible exemplary arrangement of a drive train according to the disclosure of a working machine.

Identical objects, functional units and comparable components are designated with the same reference numerals throughout the figures. These objects, functional units and comparable components are identical in form in terms of their technical features, unless explicitly or implicitly apparent otherwise from the description.

FIG. 1 shows, by way of example and schematically, a possible exemplary arrangement of a drive train 1 according to the disclosure in the form of a functional diagram for a working machine, not shown in FIG. 1. The drive train 1 shown by way of example comprises a working drive 2 having a first electric motor 3, a working transmission 4 and a working hydraulics system 5 operated by an electro-hydraulic pump 5. The drive train 1 further comprises a traction drive 6 having a second electric motor 7, a traction transmission 8 and a drive shaft 9. According to the example, the traction transmission 8 includes an auxiliary transmission 8' and a power-shift part 8". The working drive 2 is driven by the first electric motor 3, the traction drive 6 is driven by the second electric motor 7. A drive connection can additionally be established between the working drive 2 and the traction drive 6 via a connecting clutch 10. The traction drive 6 can thus additionally be driven by the first electric motor 3. Likewise, the working drive 6 can, however, additionally also be driven by the second electric motor 7.

According to the exemplary embodiment of FIG. 1, this additional drive connection leads from the first electric motor 3 via the working transmission 4, via the connecting clutch 10 to an intermediate shaft, not shown in greater detail, of the power-shift part 8". Alternatively, the additional drive connection leads from the second electric motor 7 via the auxiliary transmission 8', the mentioned intermediate shaft of the power-shift part 8" and the connecting clutch 10 to the working hydraulics system 5. Thus, in this case, a separate intermediate shaft does not have to be provided for adaptation of the direction of rotation of the first electric motor 3.

Adaptation of the direction of rotation likewise takes place via the intermediate shaft of the power-shift part 8". According to the example, the intermediate shaft selected for establishing the drive connection is chosen such that an output speed of the comparatively more slowly rotating working transmission 4 is adapted to an output speed of the comparatively more quickly rotating traction transmission 8.

Figure 2:
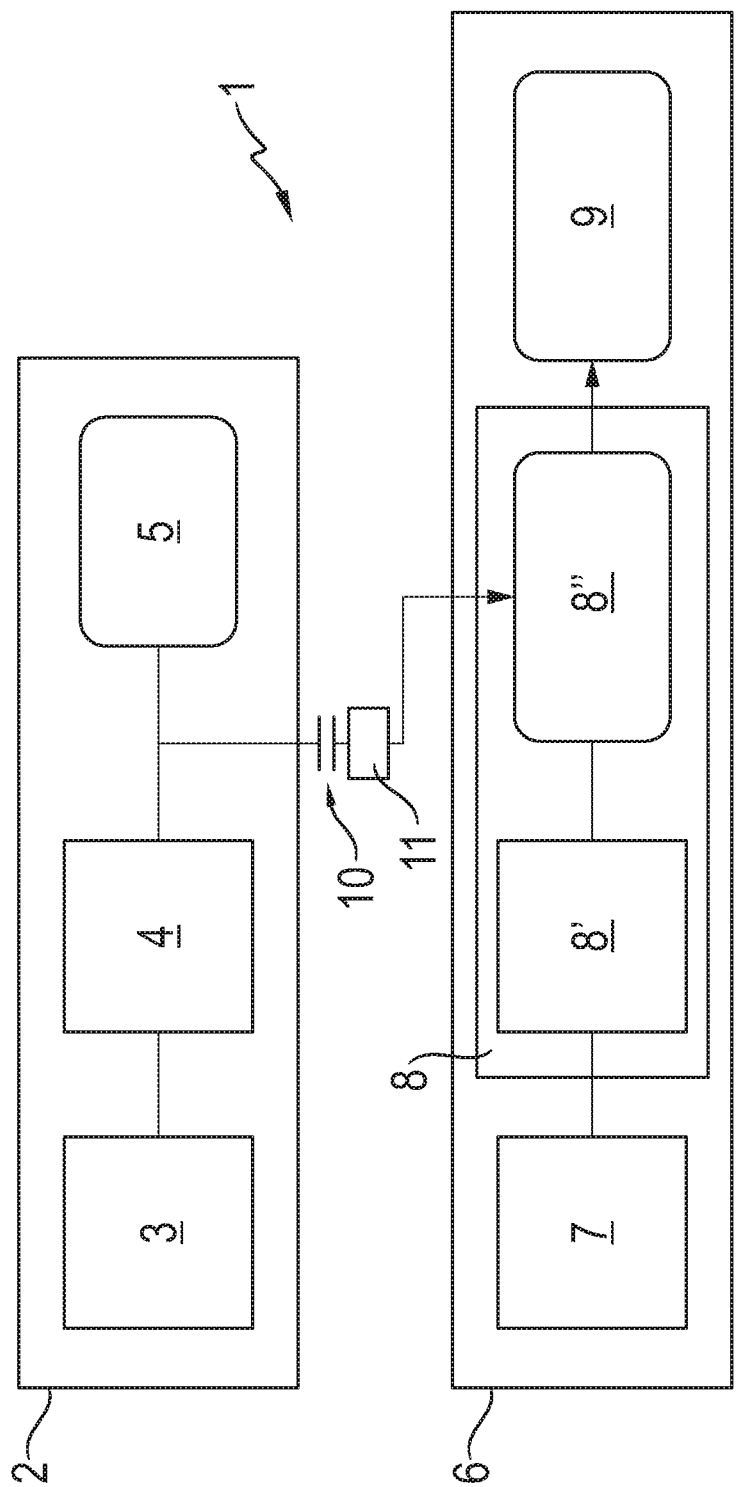
FIG. 2 shows, by way of example and schematically, a further possible exemplary arrangement of a drive train according to the disclosure.

FIG. 2 shows, by way of example and schematically, a further possible exemplary arrangement of a drive train 1 according to the disclosure in the form of a functional diagram for a working machine, not shown in FIG. 2. The exemplary arrangement illustrated in FIG. 2 differs from the exemplary arrangement shown in FIG. 1 by the path of the drive connection from the working drive 2 to the traction drive 6 and vice versa. According to the example, the drive connection in FIG. 2 runs from the first electric motor 3 via the working transmission 4, via the connecting clutch 10 and further to a separate intermediate shaft 11, which permits an adaptation of the direction of rotation, to an output shaft of the power-shift part 8". The drive connection from the second electric motor 7 correspondingly runs via the traction transmission 8, the separate intermediate shaft 11 and the connecting clutch 10 to the working hydraulics system 5.

Figure 3:
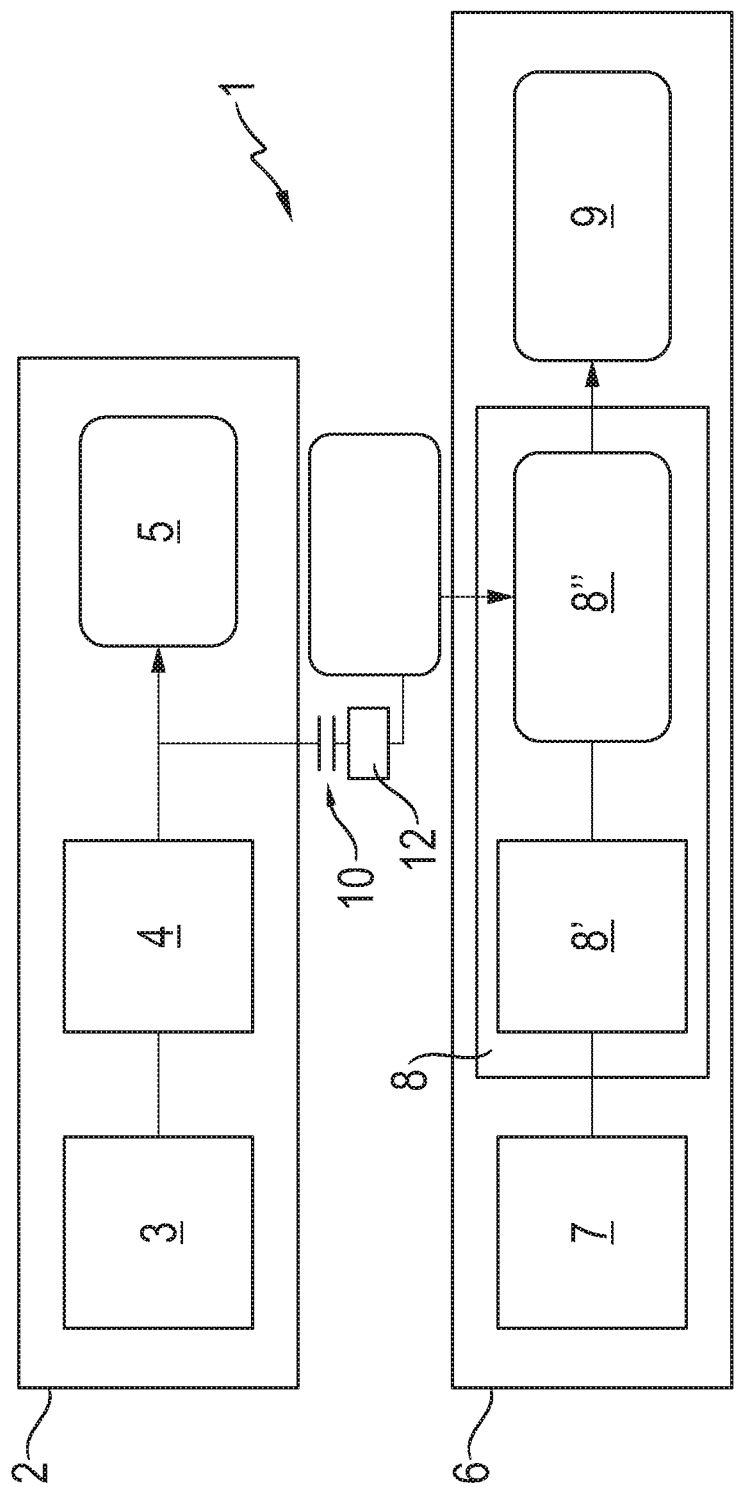
FIG. 3 shows, by way of example and schematically, yet a further possible exemplary arrangement of a drive train according to the disclosure.

FIG. 3 shows, by way of example and schematically, yet a further possible exemplary arrangement of a drive train 1 according to the disclosure in the form of a functional diagram for a working machine, not shown in FIG. 3. The exemplary arrangement shown in FIG. 3 likewise differs from the exemplary embodiment shown in FIG. 1 by the path of the drive connection. According to the example, the drive connection in FIG. 3 runs from the first electric motor 3 via the working transmission 4, via the connecting clutch 10 and further to a separate transmission stage 12, which in addition to permitting an adaptation of the direction of rotation also permits an adaptation of the speed, to an output shaft of the power-shift part 8". The drive connection from the second electric motor 7 correspondingly runs via the auxiliary transmission 8', via the separate transmission stage 12 and the connecting clutch 10 to the working hydraulics system 5.

Figure 4:
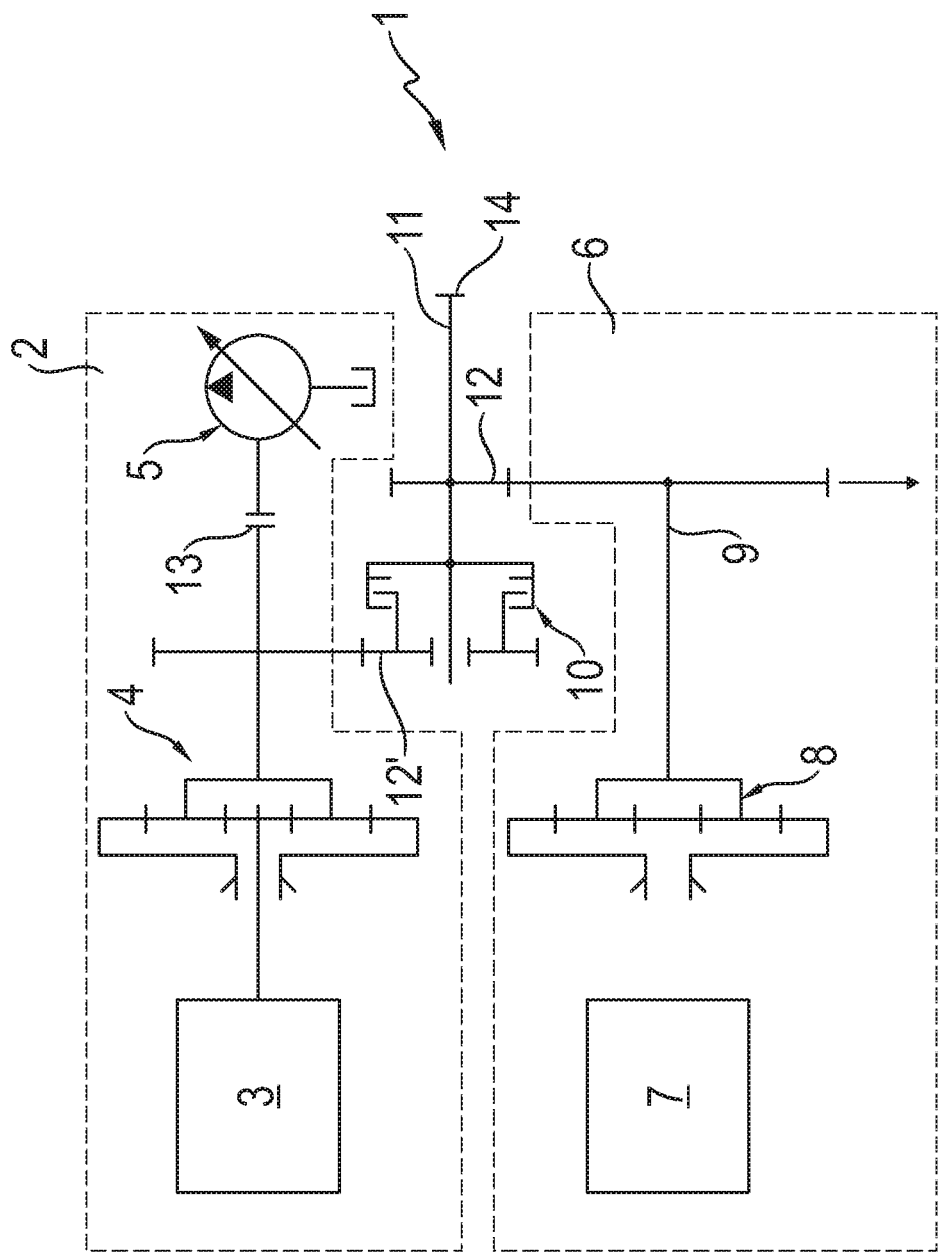
FIG. 4 shows, by way of example and schematically, a possible exemplary arrangement of a drive train 1 according to the disclosure in the form of a wheel diagram.

FIG. 4 shows, by way of example and schematically, a possible exemplary arrangement of a drive train 1 according to the disclosure in the form of a wheel diagram. The drive train 1 shown in FIG. 4 comprises a working drive 2 having a first electric motor 3, having a working transmission 4 in the form of a planetary transmission 4, and a working hydraulics system 5. The working hydraulics system 5 can be separated from the first electric motor 3 in terms of drive via a clutch 13.

The drive train 1 further comprises a traction drive 6 having a second electric motor 7, having a traction transmission 8, likewise in the form of a planetary transmission, and having an output shaft 9. A drive connection can be established from the working drive 2 to the traction drive 6 and vice versa via the connecting clutch 10 and a transmission stage 12, 12'. As can be seen, the drive connection in the example of FIG. 4 runs, starting from the first electric motor 3, via the working transmission 4, via the connecting clutch 10 and the transmission stage 12, 12' to the output shaft 9 of the traction drive 6. The transmission stage 12, 12' is thereby arranged on the intermediate shaft 11. Both an adaptation of the speed and an adaptation of the direction of rotation of the first electric motor 3 is thereby made possible.

As can further be seen in FIG. 4, the intermediate shaft 11 is lengthened and has at one axial end a PTO (power take off) interface 14, which is in non-separable drive connection with the traction drive 6, or the second electric motor 7. Conversely, the drive connection runs, starting from the second electric motor 7, via the traction transmission 8, the output shaft 9, the transmission stage 12, 12' and the connecting clutch 10 and the clutch 13 to the working hydraulics system 5.

According to a further exemplary arrangement, not shown, of a drive train 1 according to the disclosure, the PTO interface 14 shown in FIG. 4 is in non-separable drive connection not with the traction drive 6, or the second electric motor 7, but with the working drive 2, or the first electric motor 3.

Figure 5:
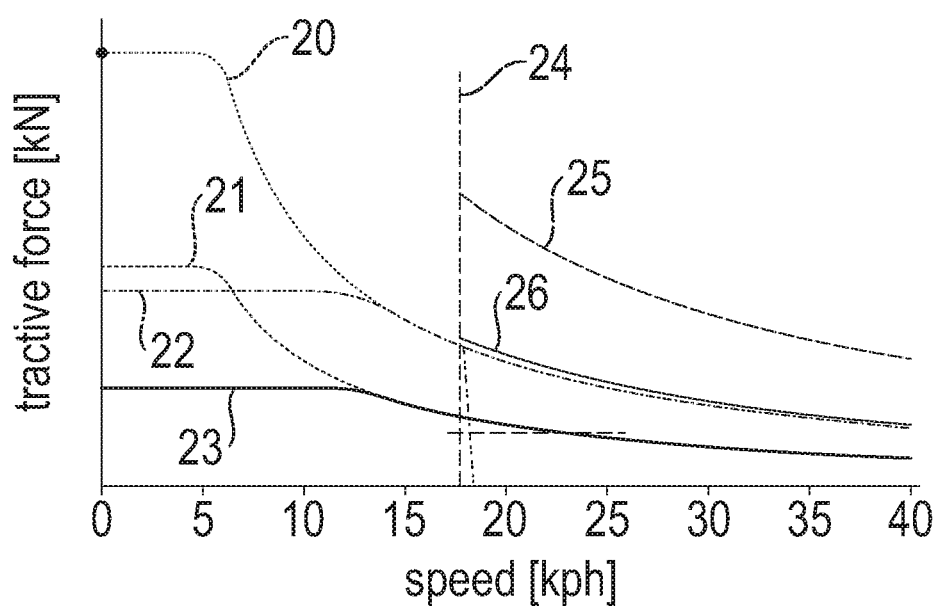
FIG. 5 shows, by way of example, various torque curves of the traction drive in dependence on a travelling speed.

FIG. 5 shows, by way of example, various torque curves 20, 21, 22, 23 of the traction drive (shown on the y-axis) in dependence on a travelling speed (shown on the x-axis) of a working machine, not shown. Torque curve 20 describes the torque at maximum power of the second electric motor 7 in a low gear stage of the traction transmission 8 with increasing speed. As can be seen, the torque, as expected, decreases as the speed of the working machine increases. Torque curve 21, on the other hand, describes the torque at continuous operating power of the second electric motor 7 in a low gear stage of the traction transmission 8 with increasing speed. In this case, the torque is comparatively lower than in the case of torque curve 20 and likewise falls as the speed increases.

Torque curve 22 describes the torque at maximum power of the second electric motor 7 in a comparatively higher gear stage of the traction transmission 8 with increasing speed. In this case too, the torque, as expected, decreases as the speed of the working machine increases.

Finally, torque curve 23 describes the torque at continuous operating power of the second electric motor 7 in the same gear stage as torque curve 22 with increasing speed. Owing to the falling torque curves 20, 21, 22, 23 at higher speeds, sharp acceleration is accordingly no longer possible at higher speeds. Even small inclines of the ground can lead to a loss of speed. By implementing the method according to the disclosure in a drive train 1 according to the disclosure, it is recognized, on reaching a specific speed, which is indicated in FIG. 5 by a dotted line 24, that a specified power criterion has been met. Accordingly, a connecting clutch 10 is closed, so that the traction drive 6 is additionally driven by the first electric motor 3. As a result, the torque according to torque curves 20 and 22 increases from line 24 to a torque curve corresponding to curve 25. The torque according to torque curves 21 and 23 increases from line 24 to a torque curve corresponding to curve 26.

Figure 6:
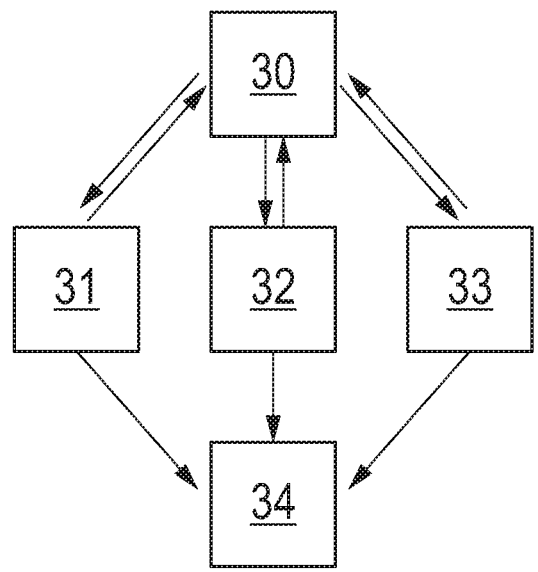
FIG. 6 shows, by way of example and schematically, a possible exemplary arrangement of a method according to the disclosure for operating a drive train of a working machine in the form of a flow diagram.

FIG. 6 shows, by way of example and schematically, a possible exemplary arrangement of a method according to the disclosure for operating a drive train 1 of a working machine in the form of a flow diagram. The drive train 1 comprises a working drive 2 and a traction drive 6, wherein the working drive 2 is driven by a first electric motor 3 and the traction drive 6 is driven by a second electric motor 7.

In a first method step 30, state values of the traction drive are continuously detected as comparison values for comparison with specified power criteria. According to the example, the specified power criteria are the exceeding of a limit speed, the exceeding of a limit time for which the second electric motor 3 is operated in a peak power range, and the exceeding of a limit gear stage of the traction transmission 8.

In step 31, the detected speed of the working machine is compared with the specified limit speed. If it is detected that the limit speed has been exceeded, the corresponding power criterion of the traction drive 6 is met and in step 34 the connecting clutch 10 is closed so that the traction drive 6 is additionally driven by the first electric motor 3. If, however, it is not detected that the limit speed has been exceeded, the method starts again at step 30.

In step 32, which is carried out at the same time as step 31, a detected period of time for which the second electric motor 7 has been operating in the peak power range is compared with a specified limit time. If it is detected that the limit time has been exceeded, the corresponding power criterion of the traction drive 6 has been met and in step 34 the connecting clutch 10 is closed so that the traction drive 6 is additionally driven by the first electric motor 3. If, however, it is not detected that the limit time has been exceeded, the method here too starts again at step 30.

In step 33, which is carried out at the same time as steps 31 and 32, a detected and engaged gear stage of the traction transmission 8 of the traction drive 6 is compared with a specified limit gear stage of the traction transmission 8. If the detected and engaged gear stage is higher than the limit gear stage, that is to say the limit gear stage has been exceeded, the corresponding power criterion of the traction drive 6 has been met. Accordingly, in step 34, the connecting clutch 10 is closed so that the traction drive 6 is additionally driven by the first electric motor 3. If, however, it is not detected that the limit gear stage has been exceeded, the method here too starts again at step 30.

The invention claimed is:

1. A method for operating a drive train of a working machine, wherein the drive train comprises a working drive and a traction drive, the method comprising driving the working drive by a first electric motor and driving the traction drive by a second electric motor, wherein the traction drive is additionally driven by the first electric motor if at least one power criterion of the traction drive is met; wherein the at least one power criterion includes exceeding a limit year stage of a fraction transmission.

2. The method as claimed in claim 1, wherein the power criterion is exceeding a limit speed.

3. The method as claimed in claim 1, wherein the power criterion is exceeding a limit time for which the second electric motor is operated in a peak power range.

4. The method as claimed in claim 2, wherein the limit speed is a maximum of 20 km/h.

5. A method for operating a drive train of a working machine, wherein the drive train comprises a working drive and a traction drive, the method comprising driving the working drive by a first electric motor and driving the traction drive by a second electric motor, wherein the traction drive is additionally driven by the first electric motor if at least one power criterion of the traction drive is met, wherein the working drive is permanently driven by the first electric motor, and wherein a power supply of the first electric motor to the working drive is adjusted or regulated via an adjustable piston stroke height of a hydraulic pump if the traction drive is additionally being driven by the first electric motor.

6. The method as claimed in claim 1, wherein the traction drive is additionally driven by the first electric motor only if a power required by the working drive can be supplied thereto by the first electric motor.

7. The method as claimed in claim 1, wherein the working drive is additionally driven by the second electric motor if at least one power criterion of the working drive is met.

8. A drive train for a working machine, wherein the drive train comprises a working drive having a working transmission and a first electric motor, and a traction drive having a traction transmission, a second electric motor and a power-shift part, wherein the working drive can be driven by the first electric motor via the working transmission and wherein the traction drive can be driven by the second electric motor via the traction transmission, wherein a drive connection can be established between the working drive and the traction drive via a connecting clutch.

9. The drive train as claimed in claim 8, wherein the drive connection runs from the first electric motor to the traction drive via an intermediate shaft for adaptation of the direction of rotation.

10. The drive train as claimed in claim 9, wherein the intermediate shaft is an intermediate shaft of the traction transmission.

11. The drive train as claimed in claim 8, wherein a separate transmission stage is provided, via which an adaptation of the speed and/or an adaptation of the direction of rotation of the first electric motor to the second electric motor is made possible.

12. The drive train as claimed in claim 8, wherein the traction transmission is configured so as to be power-shiftable over a plurality of gear stages.

13. A working machine comprising a drive train as claimed in claim 8.

14. The drive train of claim 10, wherein a separate transmission stage is provided, via which an adaptation of the speed and/or an adaptation of the direction of rotation of the first electric motor to the second electric motor is made possible.

15. The drive train of claim 14, wherein the traction transmission is configured so as to be power-shiftable over a plurality of gear stages.

16. The drive train of claim 9, wherein the traction transmission is configured so as to be power-shiftable over a plurality of gear stages.

17. The method of claim 1, wherein the at least one power criterion of the traction drive includes both a limit speed and a limit time for which the second electric motor is operated in a peak power range.

18. The method of claim 17, wherein the limit speed is a maximum of 20 km/h.

* * * * *